Patented Dec. 17, 1929

1,740,248

UNITED STATES PATENT OFFICE

WALTER J. KLAIBER, OF PITTSBURGH, PENNSYLVANIA, ASSIGNOR TO THE KOPPERS COMPANY, A CORPORATION OF PENNSYLVANIA

PROCESS FOR DEHYDRATING GAS

Application filed August 28, 1926. Serial No. 132,103.

My invention relates to processes for dehydrating gas such, for example, as coke oven gas, coal gas, water gas and the like.

My invention has, for one of its objects, to provide a process for dehydrating gas wherein the dew-point of the gas may be reduced materially below the temperature of the gas.

A second object of my invention is to provide a process for dehydrating gas wherein its dew-point may be lowered without reducing the temperature of the gas to a corresponding degree.

A further object of my invention is to provide a process for dehydrating gas wherein the gas is treated by a solution such that the resulting dew-point of the gas is lower than the temperature of the solution.

A still further object of my invention is to provide a process in which a difference in vapor pressure may be employed to transfer water between circulating fluids.

In the prior art of dehydrating gas, it has been necessary, in order to remove water vapor therefrom, to reduce the temperature of the gas to that corresponding to the desired dew-point. For example, if it has been desired to dehydrate the gas to a dew-point of 30° F., the entire volume of gas has been cooled to 30° F. or to a lower temperature. It has been the practice, also, to employ a refrigerant for the purpose of cooling the gas and it has been necessary that the temperature of such refrigerant be lower than that to which the gas is to be reduced. The refrigerant has usually been a comparatively dilute brine, such, for example, as a calcium chloride solution having a specific gravity of 1.2 (at 20° C.).

In accordance with the present invention, I employ a highly concentrated brine which may be, for example, an aqueous solution of calcium chloride, magnesium chloride, or similar salts, which have very low vapor pressures as compared with the vapor pressure of water, or dilute brines, at the same temperature. By the use of solutions of this character, gas may be dehydrated and the dew-point thereof may be lowered without correspondingly lowering the temperature of the gas.

The principle of the improved process constituting my invention may be employed either in a single stage or in two stages, as desired. In the single stage process, the concentrated salt solution is refrigerated to such temperature that the combined effect of the differences in vapor pressures and in temperatures between the gas and the salt solution is to reduce the dew-point of the gas to the desired temperature in a single treatment of the gas. In the two-stage process, the salt solution and the gas are at approximately the same temperatures in the initial stage and the dew-point is lowered by reason of the difference in vapor pressure. In the second stage, a refrigerated concentrated salt solution further dehydrates the gas to the desired dew-point.

My invention will be described in connection with the accompanying drawing, in which the single figure is a partially diagrammatic view of apparatus employed in the process constituting my invention.

Referring to the drawing, a scrubbing tower 1 comprises a lower section 2 and an upper section 3 that are connected by a duct 4. The tower has an inlet pipe 5, by means of which gas is admitted to the tower, and an outlet pipe 6, by means of which the gas is conducted to any suitable storage space.

The tower is provided with a section of wooden hurdles 7 in its lower section 2 that are adapted to be covered with a dehydrating solution supplied by a plurality of sprays 8, which are in turn supplied by a pipe line 9. The tower 1 is provided, in its upper section 3, with a second section of hurdles 11 that are supplied with dehydrating solution by means of a second group of sprays 12 that are supplied with dehydrating solution by means of a pipe line 13.

The sections 2 and 3 of the tower 1 are respectively provided with collecting tanks 14 and 15. The collecting tank 14 is connected to a sump 16 for the dehydrating solution. An evaporator 17, that may be either of the continuous or the intermittent type, is connected to the sump 16 by means of pipes 18 and 19, through which dehydrating solution is circulated by a pump 20. A cooler 21, that is provided with a coil 22 and a suitable water spray 23, cools the solution as it is supplied by the pump 20 to the pipe 9.

The circulating system for the upper section 3 comprises the collecting tank 15, an evaporator 25 and a cooler 26 that are connected in series and a pump 27 that is connected to the cooler 26, and, by means of a branch pipe 28, is connected directly to the collecting tank 15. Valves 29 and 30 control the division of the liquid flowing through the branch pipe lines. The system comprises also a refrigerating device 31 for reducing the temperature of the solution supplied to the pipe line 13.

While in actual practice the apparatus used would be designed for the specific process employed, the apparatus illustrated in the drawing and described hereinabove may be utilized for the single-stage process, although it is especially adapted for the two-stage process.

The single-stage process will now be described. The gas to be treated may, for example, be saturated with water vapor at a temperature of 80° F. The gas may be treated with a saturated, or approximately saturated, solution of calcium chloride, which has been refrigerated to 55° F. (specific gravity 1.38 at 15° C., % $CaCl_2$=38.5).

The gas to be dehydrated passes through the inlet pipe 5 and upwardly through the lower section 2 of the tower and duct 4 into the section 3. After passing through the hurdles 11, it enters the pipe 6 by means of which it may be supplied to any suitable storage device or distribution system.

The sprays 12 are supplied through the pipe 13 with the highly concentrated solution at a temperature of 55° F., which flows downwardly over the hurdles 11, and the gas is brought into intimate contact with this relatively cool solution by reason of the relatively large area of contact surface of the hurdles.

The result of the contact of the gas with this highly concentrated solution of relatively low vapor pressure and relatively low temperature is that the solution absorbs water from the gas and, at the same time, lowers the temperature of the gas whereby the dew-point of the gas is reduced to a point considerably lower than 55° F. and approaching 28.4° F. The approach of the dew-point of the gas to the limit specified depends upon the efficiency of the contact apparatus that is employed. It will be appreciated, also, that further lowering of the temperature of the $CaCl_2$ solution will operate to dehydrate the gas to a correspondingly lower dew-point.

The temperature of the $CaCl_2$ solution is raised by reason of its contact with the gas at a higher temperature and by reason, also, of the heat of condensation of the water vapor removed from the gas. The solution is somewhat diluted by the water that has been absorbed.

The dilute and somewhat heated solution collects at the bottom of the tower section 3, in the collecting tank 15, from which it flows toward the valves 29 and 30. The pump 27 draws a portion of the dehydrating solution through the evaporator 25, which may operate either continuously or intermittently, as desired, to remove water from the solution at the same rate as that at which it is absorbed in the tower 1 in order that the concentration of the solution may be uniform. The pump 27 also draws the dehydrating solution from the evaporator 25 through the cooler 26, where its temperature is reduced to approximately 80° F. The pump 27 then circulates the partially cooled solution through the refrigerating device 31, where it is reduced to a temperature of approximately 55° F., and is supplied through the pipe 13 to the sprays 12.

Instead of reducing the dew-point of the gas to the temperature desired in a single stage, I may secure the same result in two stages with the advantage that the capacity of the refrigerating device may be materially diminished. All of the apparatus shown in the drawing, including both sections of the tower with their circulating systems, is employed in the two-stage process.

When the gas to be dehydrated enters through the pipe 5 and traverses the lower section of hurdles 7, it encounters concentrated salt solution at approximately the same temperature, 80° F. A saturated solution of calcium chloride at 80° F. contains 858 parts of $CaCl_2$ in 1000 parts of water and has a specific gravity of 1.47. Theoretically, the gas would be dehydrated to a dew-point of 45° F. by treatment with this solution, since the Vapor pressure of a saturated
  solution of calcium chloride
  at 80° F._____ 7.6 mm. Hg.
Vapor pressure of saturated
  aqueous vapor at 45° F._____ 7.6 mm. Hg.

However, actual experimental data indicates that, with a solution of calcium chloride at 80° F. and having a specific gravity 1.41 to 1.45, the dew-point of gas may be reduced to approximately 48 to 50° F. Accordingly, the gas, upon leaving the section of hurdles 7 and entering the lower portion of the section of hurdles 11, has a dew-point of approximately 48° F.

The gas now comes in contact with a similar highly concentrated solution at a temperature of 55° F. By reason of the lower temperature of the solution in the upper section of the tower, the dew-point of the gas will be reduced to 30° F. It may be noted that the Vapor pressure of sat. $CaCl_2$
  solution at 55° F._____ 3.9 mm. Hg.
Vapor pressure of super-cooled
  water at 30° F._____ 4.2 mm. Hg.

The dilute refrigerated solution from the upper section of the tower flows downwardly into the collecting tank 15 and is circulated as described in connection with the single stage process. The dilute solution in the lower section of the tower flows into the collecting tank 14 and then into the sump 16. The pump 20 circulates a portion of the solution from the sump 16 through the evaporator 17 to maintain the concentration of the solution. The solution is also drawn directly from the sump 16 by the pump 20 and forced through the cooler 21 whereby the temperature of the solution is reduced to approximately 80° F.

The principal advantage of the two-stage process over the single-stage process resides in the fact that only a relatively small portion of the total dehydrating solution need be refrigerated and, accordingly, the refrigerating plant may be of relatively small capacity. The principle of the two processes is, however, substantially the same in that, in each of them, the difference in vapor pressure between the dehydrating solution and water at the same temperature is employed to dehydrate the gas without a corresponding lowering of the temperature of the latter.

It will be noted that, by means of the processes that I have provided, the dew-point of the gas that is treated may be reduced to a point that is materially lower than the temperature of the gas or the temperature of the solution employed in treating the gas. Accordingly, it is unnecessary to reduce the temperature of the gas to that of the desired dew-point. It is not necessary that the temperature of the solution employed be materially lower than that of the gas. The foregoing results are secured by the employment of a concentrated solution having a vapor pressure that is lower than that of water or dilute brine at the same temperature. The difference in vapor pressures causes the transfer of water from the gas to the solution.

I claim as my invention:

1. The process of dehydrating gas which comprises treating the gas with a highly concentrated hygroscopic salt solution at substantially the temperature of the gas and then treating said gas with a similar solution at a lower temperature.

2. The process of dehydrating gas which comprises treating the gas with a highly concentrated solution of the salt of an alkaline earth metal at substantially the temperature of the gas and then treating the gas with a similar solution at a lower temperature.

3. The process of dehydrating gas which comprises passing the gas through a portion of a scrubbing tower in contact with a hygroscopic salt solution at approximately the temperature of the gas and then passing the gas through a portion of a scrubbing tower in contact with a similar solution at a lower temperature.

4. The process of dehydrating gas in two stages which comprises supplying a hygroscopic salt solution at approximately the temperature of the gas for contact with the gas in the first stage, supplying similar solution at a lower temperature for contact with the gas in the second stage, removing water from the diluted solutions and cooling the solutions to the different temperatures.

5. The process of dehydrating gas which comprises supplying a concentrated hygroscopic salt solution at approximately the temperature of the gas to the lower portion of a scrubbing tower for contact with the gas to be treated, supplying similar solution at a materially lower temperature to the upper portion of said tower for contact with the initially treated gas, restoring the concentration of the diluted solutions and cooling the solutions to the different temperatures for recirculation in the respective stages of the process.

6. The process of dehydrating gas which comprises treating it at an initial stage with a highly concentrated hygroscopic salt solution at approximately the temperature of the gas to lower the dew-point of the gas below the temperature of the solution and then treating the gas at a second stage with a similar solution at a materially lower temperature to further lower the dew-point of said gas.

In testimony whereof, I have hereunto subscribed my name this 27th day of August, 1926.

WALTER J. KLAIBER.